Sept. 25, 1956 A. HEYDUCK 2,764,714

CIRCUIT ARRANGEMENT TO SEND DISCRIMINATIVE SWITCHING MARKS IN COMMUNICATION SYSTEMS

Filed Jan. 27, 1953 2 Sheets-Sheet 1

INVENTOR
A. HEYDUCK
Robert Harding Jr.
ATTORNEY

Sept. 25, 1956 A. HEYDUCK 2,764,714
CIRCUIT ARRANGEMENT TO SEND DISCRIMINATIVE
SWITCHING MARKS IN COMMUNICATION SYSTEMS
Filed Jan. 27, 1953 2 Sheets-Sheet 2

INVENTOR
A. HEYDUCK
Robert Harding
ATTORNEY

United States Patent Office 2,764,714
Patented Sept. 25, 1956

2,764,714

CIRCUIT ARRANGEMENT TO SEND DISCRIMINATIVE SWITCHING MARKS IN COMMUNICATION SYSTEMS

Alfred Heyduck, Stuttgart-Zuffenhausen, Germany, assignor to International Standard Electric Corporation, New York, N. Y., a corporation of Delaware Application January 27, 1953, Serial No. 333,573

Claims priority, application Germany February 1, 1952

2 Claims. (Cl. 317—137)

This invention relates to a circuit arrangement for communication systems that serves to send discriminative switching signals over two-wire lines, in particular from subsets of telephone exchanges.

An object of the invention is to provide a circuit arrangement which serves to send discriminative switching signals over two-wire lines in a manner to avoid sequence action.

The invention comprises an arrangement in which, in order to accomplish three switching operations independently of each other, the receiving station has a relay joined to one wire, a second relay joined to the other wire, and a differential relay bridged between the two wires, and in which the two first said relays each perform one of the three switching operations, whereas the third of these operations is effected by the differential relay acting in conjunction with one of the two other relays.

Figure 1:
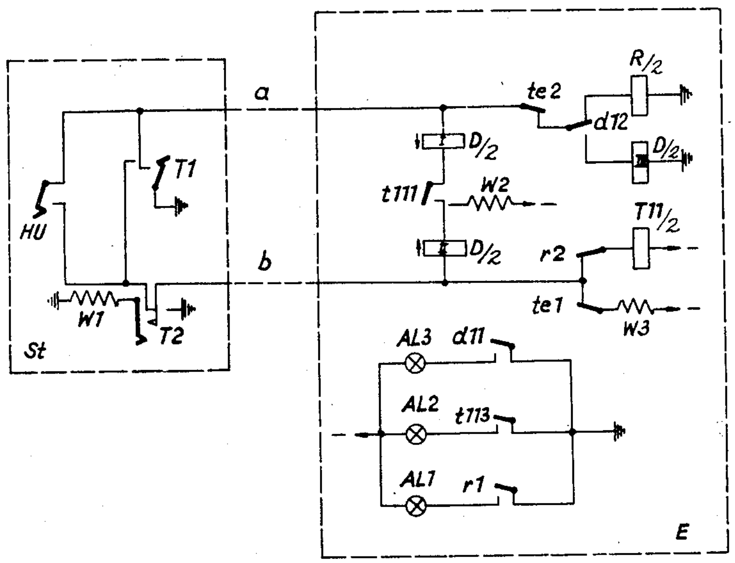
Figure 2:
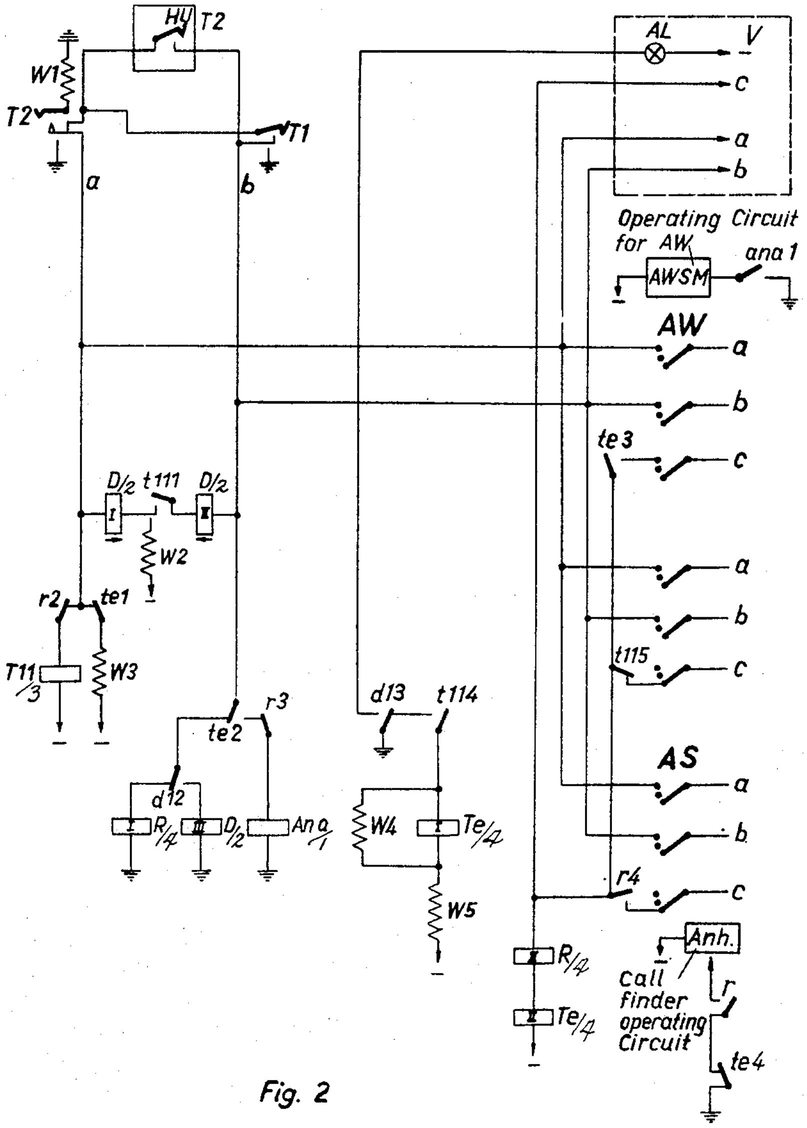

The invention is illustrated in the accompanying drawings in which Figs. 1 and 2 are circuit diagrams showing two embodiments of the invention.

Fig. 1 represents a circuit arrangement suitable for general control actions effected over a two-wire line. A control station *St* comprises three switches HU, T1, T2. Switch HU serves to short or bridge the wires *a*, *b*, switch T1 serves to apply ground potential to both of them, and switch T2 serves to apply ground potential to wire *b* only.

In the receiving station E, the wires *a*, *b* have relays R, T11 connected as shown. Station E also has a differential relay D that can be bridged across the wires *a*, *b* by a contact *t*111 arranged to apply negative potential to the two coils of relay D.

Switch HU when closed completes the following circuit, parallel branches being represented by placing the reference characters of the elements involved above and below a horizontal line:

$$+(\mathrm{E}),\ \mathrm{R},\ d12,\ te2,\ a,\ \mathrm{HU},\ \mathrm{T2}\ \text{closed},\ b,\ \frac{r2,\ \mathrm{T11}}{te1,\ \mathrm{W3}},-$$

In this circuit the relay R responds, while relay T11 remains at rest. Since relay T11 is connected in parallel with resistor W3 and this parallel circuit is in series with the relay R, there will be insufficient current passing through relay T11 to cause its operation. Contact *r*1 of relay R closes the circuit of a lamp AL1 which lights. Contact *r*2 of relay R opens the circuit through T11, thus ensuring against this relay operating.

By closing the key T1, ground potential is applied to both the wires *a*, *b*. In this case, since no other relay is in series with it, the relay T11 responds in the circuit:

$$+(\mathrm{S}t),\ \mathrm{T1},\ \mathrm{T2},\ b,\ \frac{r2,\ \mathrm{T11}}{te1,\ \mathrm{W3}},-$$

If relay R had been operated, it releases because ground potential has been applied to the ends of its coil. Relay D can likewise not respond over the closed contact *t*111 because the magnetic flux of this relay has been nullified in the two windings I and II, despite negative potential having been applied to the relay through resistor W2. Contact *t*113 of relay T11 causes a lamp AL2 to light.

By closing the key T2, ground is applied to wire *b*, whereby relay T11 is likewise caused to respond. In this case relay D(II) is energized over *t*111:

$$+,\ \mathrm{T2},\ b,\ \mathrm{D(II)},\ t111,\ \mathrm{W2},\ -$$

Contact *d*11 of relay D closes the circuit of a third lamp AL3. It will thus be seen that the arrangement described enables three different switching operations in a control station to produce three operations in a receiving station to which they are conducted over a two-wire line. Any one of these switching operations may be performed alone or two or more may be performed in any sequence.

In Fig. 2 this arrangement is shown, by way of example, as employed in connection with the subscriber's line of a P. B. X system comprising call finders. The circuitry so created has the advantage that the switching operations initiated by a caller will be rendered effective at once without the aid of any control selector. The caller can avail himself of three possibilities to set up connections:

1. Engagement, over call finder AS, of an assembly for the setting-up of home connections,
2. Engagement of an office selector AW,
3. Calling the exchange V.

In order to establish a home connection, the caller lifts his handset and thereby closes, over switch HU, the subscriber's loop:

$$+,\ \mathrm{R(I)},\ d12,\ te2,\ b,\ \mathrm{HU},\ \mathrm{T2},\ \frac{r2,\ \mathrm{T11}}{te1,\ \mathrm{W3}},-$$

Relay R(I) responds and by means of contact *r*2 disconnects relay T11. At the same time the call finder AS is started through the circuit:

$$+,\ te4,\ r\ .\ .\ .\ \mathrm{A}nh$$

and hunts for and finds the calling line. The resultant test circuit is: —, T*e*(II), R(II), *r*4, *c*, ground of the next following connecting device.

In this circuit relay T*e*(II) responds and relay R continues to be energized. The finder AS stops on the calling line because of the opening of the starting circuit at *te*4.

If the caller desires to engage an office assembly, represented by office selector AW, he actuates the key T1 before lifting the handset. Thereby ground is applied to the wires *a*, *b*. As described with reference to the first example, Fig. 1, only relay T11 is energized through this manipulation. Contact *t*114 thereof closes the circuit of relay T*e*:

$$+,\ d13,\ t114,\ \mathrm{T}e\mathrm{(I)/W4},\ \mathrm{W5},\ -$$

Contact *te*2 of T*e* is consequently switched to connect relay A*na* to the subscriber's line. Contacts A*na*1 of relay A*na* cause the office selector AW to be started by the operating circuit AWSM. As contact *te*3 of T*e* has been closed to complete the test wire of selector AW, the relays R, T*e* will be energized as soon as this selector is connected to the calling line. These relays disconnect the subscriber's line from the source of current, as described before, and relay R opens the circuit for relay A*na* which releases and opens the operating circuit for the selector AW at A*na*1, thus stopping the selector AW on the calling line.

If the caller desires a call to be mediated by the exchange, for the reason, for instance, that all the office lines are busy, then he depresses the key T2 before lifting the handset. This will apply ground-potential to wire *a*:

$$+,\ \mathrm{T2},\ a,\ \frac{r2,\ \mathrm{T11}}{te1,\ \mathrm{W3}},-$$

Relay T11 responds and thus closes its contact *t*111, whereby the differential relay D is bridged across the wires

*a*, *b*. The switching of contact *t*111 also causes negative potential to be applied to this contact over resistance W2. In this case relay D can respond since the ground potential applied to relay R(I) is reduced in value by the resistance thereof. Relay D responds in the circuit:

+, T2, *a*, D(I), *t*111, W2, −

By contact *d*12 of relay D the wire *b* is switched over to a third winding DIII thereof. Relay D hence remains excited in the subscriber's loop when the handset is removed and key T2 is released. At the same time a signaling circuit reaching into the exchange V is closed, viz:

+, *d*13, AL, −

The exchange operator, rendered attentive by the calling lamp AL, now shining, applies ground to wire *c* and thereby causes energization of the relays R(II), T*e*(II) included in this wire. By these relays responding, the subscriber's line is disconnected from the source of current. The power for the subset is supplied by the exchange V.

What I claim is:

1. A circuit arrangement for independently controlling three operations from a remote point over a pair of wires comprising a control station, a receiving station, a pair of wires connecting said stations, a first relay at said receiving station, means for connecting the winding of said first relay between one of said wires and ground, a source of potential at said receiving station having one of its poles grounded, a second relay at said receiving station, means for connecting the winding of said second relay between the other of said wires and the other pole of said source of potential, means for preventing the operation of said second relay when the winding thereof is in series with the winding of said first relay, a differential relay having two windings, one connected to one of said wires and one connected to the other, means including a contact of said second relay for connecting the free ends of said two windings together and to the ungrounded pole of said source of potential, and means at said control station for selectively connecting said wires together, connecting both said wires to ground, and connecting the wire connected to said second relay to ground.

2. A circuit arrangement for independently controlling three operations from a remote point over a pair of wires comprising a control station, a receiving station, a pair of wires connecting said stations, a first switch means at said control station for connecting said wires together, a second switch means at said control station, independent of said first switch means, for grounding both said wires, a third switch means at said control station, independent of the other two, for grounding one of said wires, a first relay at said receiving station, means for connecting the winding of said first relay between the other of said wires and ground, a source of potential having one of its poles grounded, a second relay at said receiving station, means for connecting the winding of said second relay between the other pole of said source of potential and said one wire, means for preventing the operation of said second relay when the winding thereof is in series with the winding of said first relay, a differential relay having two windings, one connected to one of said wires and one connected to the other, and means including contacts of said second relay for connecting the free ends of the two windings of said differential relay together and to the ungrounded pole of said source of potential.

References Cited in the file of this patent

UNITED STATES PATENTS

| | | |
|---|---|---|
| 1,787,550 | Sorensen | Jan. 6, 1931 |
| 2,303,875 | Baughman | Dec. 1, 1942 |
| 2,424,243 | Lowell | July 22, 1947 |
| 2,444,039 | Goddard | June 29, 1948 |
| 2,446,216 | Dodd | Aug. 3, 1948 |